(12) United States Patent
Sundström

(10) Patent No.: US 8,401,015 B2
(45) Date of Patent: *Mar. 19, 2013

(54) METHOD, DEVICE, COMPUTER PROGRAM PRODUCT AND SYSTEM FOR REPRESENTING A PARTITION OF N W-BIT INTERVALS ASSOCIATED TO D-BIT DATA IN A DATA COMMUNICATIONS NETWORK

(75) Inventor: Mikael Sundström, Luleå (SE)

(73) Assignee: Oricane AB, Lulea (SE)

( * ) Notice: Subject to any disclaimer, the term of this patent is extended or adjusted under 35 U.S.C. 154(b) by 216 days.

This patent is subject to a terminal disclaimer.

(21) Appl. No.: 12/446,305

(22) PCT Filed: Oct. 19, 2007

(86) PCT No.: PCT/SE2007/050759
§ 371 (c)(1),
(2), (4) Date: Aug. 26, 2009

(87) PCT Pub. No.: WO2008/048184
PCT Pub. Date: Apr. 24, 2008

(65) Prior Publication Data
US 2010/0296514 A1 Nov. 25, 2010

(30) Foreign Application Priority Data
Oct. 20, 2006 (SE) ..................... 0602206

(51) Int. Cl.
*H04L 12/28* (2006.01)

(52) U.S. Cl. ...................... 370/392; 712/225

(58) Field of Classification Search ............. 370/392; 712/225
See application file for complete search history.

(56) References Cited

U.S. PATENT DOCUMENTS
6,003,036 A * 12/1999 Martin .................................. 1/1
(Continued)

FOREIGN PATENT DOCUMENTS
| WO | 00/28704 | 5/2000 |
| WO | 03/103240 | 12/2003 |
| WO | 2004102856 | 11/2004 |

OTHER PUBLICATIONS

Sundström et al., "High-Performance Longest Prefix Matching supporting High-Speed Incremental Updates and Guaranteed Compression", 2005, IEEE INFOCOM, 12 pages.

*Primary Examiner* — Dang Ton
*Assistant Examiner* — Wei Zhao
(74) *Attorney, Agent, or Firm* — Renner, Otto, Boisselle & Sklar, LLP

(57) ABSTRACT

The present invention relates to a method for representing a partition of n w-bit intervals associated to d-bit data in a data communications network, said method comprising the steps of: providing in a memory (102), a datagram forwarding data structure (10) provided for indicating where to forward a datagram in said network, which data structure (10) is in the form of a tree comprising at least one leaf (11) and possibly a number of nodes (13) including partial nodes, said data structure (10) having a height (h), corresponding to a number of memory accesses required for looking up a largest stored non-negative integer smaller than or equal to a query key, step 201, reducing worst storage cost by using a technique for reduction of worst case storage cost that are selectable from: partial block tree compaction, virtual blocks, bit push pulling, block aggregation or split block trees, and variations thereof, step 202, updating the layered data structure partially including by using a technique for scheduling maintenance work that are selectable from: vertical segmentation and bucket list maintenance, and providing a hybrid structure by using a technique that are selectable from cluster monitoring, path compression, prefix pointer encoding to provide a static hybrid block tree, step 203.

4 Claims, 7 Drawing Sheets

U.S. PATENT DOCUMENTS

| | | |
|---|---|---|
| 2001/0044876 A1 | 11/2001 | Brown |
| 2003/0236968 A1* | 12/2003 | Basu et al. .................... 712/225 |
| 2004/0111420 A1* | 6/2004 | Hofstee et al. ................ 707/100 |
| 2004/0230583 A1 | 11/2004 | Testa |
| 2005/0063379 A1* | 3/2005 | Wybenga et al. ............. 370/389 |
| 2011/0113129 A1* | 5/2011 | Sundstrom .................... 709/223 |

* cited by examiner

METHOD, DEVICE, COMPUTER PROGRAM PRODUCT AND SYSTEM FOR REPRESENTING A PARTITION OF N W-BIT INTERVALS ASSOCIATED TO D-BIT DATA IN A DATA COMMUNICATIONS NETWORK

This application is a national phase of International Application No. PCT/SE2007/050759 filed Oct. 19, 2007 and published in the English language.

TECHNICAL FIELD

The present invention relates to a method for representing a partition of n w-bit intervals associated to d-bit data in a data communications network. The present invention also relates to a device, system and a computer program product for performing the method.

BACKGROUND

Internet is formed of a plurality of networks connected to each other, wherein each of the constituent networks maintains its identity. Each network supports communication among devices connected to the networks, and the networks in their turn are connected by routers. Thus, Internet can be considered to comprise a mass of routers interconnected by links. Communication among nodes (routers) on Internet takes place using an Internet protocol, commonly known as IP. IP data grams (data packets) are transmitted over links from one router to the next one on their ways towards the final destinations. In each router a forwarding decision is performed on incoming data grams to determine the data grams next-hop router.

A routing or forwarding decision is normally performed by a lookup procedure in a forwarding data structure such as a routing table. Thus, IP routers do a routing lookup in the routing table to obtain next-hop information about where to forward the IP data grams on their path toward their destinations. A routing lookup operation on an incoming datagram requires the router to find the most specific path for the datagram. This means that the router has to solve the so-called longest prefix matching problem which is the problem of finding the next-hop information (or index) associated with the longest address prefix matching the incoming data grams destination address in the set of arbitrary length (i.e. between 3 and 65 bits) prefixes constituting the routing table.

To speed up the forwarding decisions, many IP router designs of today use a caching technique, wherein the most recently or most frequently looked up destination addresses and the corresponding routing lookup results are kept in a route cache. This method works quite well for routers near the edges of the network, i.e. so called small office and home office (SOHO) routers having small routing tables, low traffic loads, and high locality of accesses in the routing table.

Another method of speeding up the routers is to exploit the fact that the frequency of routing table updates, resulting from topology changes in the network etc., is extremely low compared to the frequency of routing lookups. This makes it feasible to store the relevant information from the routing table in a more efficient forwarding table optimized for supporting fast lookups.

In this context, a forwarding table is an efficient representation of a routing table and a routing table is a dynamic set of address prefixes. Each prefix is associated with next hop information, i.e. information about how to forward an outgoing packet and the rules of the game state that the next-hop information associated with the longest matching prefix of the destination address (of the packet) must be used. When changes to the routing table occur, the forwarding table is partially or completely rebuilt.

An example of a forwarding data structure is a so-called "static block tree", which is a comparison based data structure for representing w-bit non-negative integers with d-bit data and supporting extended search in time proportional to the logarithm with base B, where B−1 is the number of integers that can stored in one memory block, of the number of integers stored. Typically, it is a static data structure which supports efficient extended search with minimum storage overhead. The static block tree data structure has previously been described in the Swedish patent 0200153-5, which refers to a method and system for fast IP routing lookup using forwarding tables with guaranteed compression ratio and lookup performance where it is referred to as a Dynamic Layered Tree and also in M. Sundström and Lars-Åke Larzon, *High-Performance Longest Prefix Matching supporting High-Speed Incremental Updates and Guaranteed Compression*, IEEE INFOCOMM, Miami Fla., USA, 2005.

A basic block tree, for instance in the form of a dynamic layered tree, consists of at least one leaf and possibly a number of nodes if the height is larger than one. The height corresponds to the number of memory accesses required for looking up the largest stored non-negative integer smaller than or equal to the query key. This kind of lookup operation is referred to as extended search.

The problem solved by a basic block tree is to represent a partition, of a totally ordered universe U, consisting of n basic intervals. Since U is known, also minU and maxU are known. Therefore, it is sufficient to represent n−1 interval boundaries where each interval boundary is represented by an element which is a w-bit non-negative integer. The w-bit non-negative integer is referred to as the key and the corresponding d-bit data field as the data. In one memory block, we can store B elements and thus represent B+1 intervals. We call the resulting data structure a basic block tree of height 1. Each basic interval constitutes a subset of U. For each subset, we can recursively represent a partition consisting of B+1 intervals by using one additional memory block. By combining the original partition of U with the B+1 sub-partitions, we obtain a block tree of height 2 representing $(B+1)^2$ basic intervals. Assuming that pointers to sub-structures can be encoded implicitly, it is possibly to recursively construct a block tree of arbitrary height t for representing up to $(B+1)^t$ basic intervals.

A block tree of height t that represents exactly $(B+1)^t$ intervals is said to be complete. Otherwise it is partial. The need for pointers is avoided by storing a block tree in a consecutive array of memory blocks. To store a block tree of height t, first the root block is stored in the first location. This is followed by up to B+1 recursively stored complete block trees of height t−1 and possibly one recursively stored partial block tree of height t−1. No pointers are needed since the size s(t−1) of a complete block tree of height t−1 can be computed in advance. The root of sub-tree i is located i·s(t−1) memory blocks beyond the root block (assuming that the first sub-tree has index zero).

Typically, there are two major problems with basic block trees. The first problem is related to worst case storage cost. More precisely, the worst case amortized number of bits required for storing n keys and their corresponding data may be considerably larger than n·(w+d) in the worst case resulting in a worst case cost per key of much more than w+d bits which is optimal (at least in a sense). The second problem is related to incremental updates. A basic block tree is essentially static which means that the whole data structure must be rebuilt from scratch when a new key and data is inserted or deleted. As a result, the cost for updates is too high, i.e. at least in some applications, it takes too much time and computation, in particular if the block tree is large.

When comparing block trees with tries, for example t-level fixed stride tries, we observe a third problem with block trees namely the lookup cost. Whereas such a trie has a bounded lookup cost of t steps (or memory accesses), independently of the number of intervals, the lookup cost in a block tree grows logarithmically with the number of intervals. Another key aspect of the performance is the worst case storage costs per interval. Whereas the total storage cost in a block tree grows linearly with the number of intervals and could potentially be reduced to only w+d bits per interval using the present invention, there is an explosive growth of the worst case storage cost of a fixed stride trie if t is considerably less that w, which is typically the case since it would not make any sense otherwise to bound the lookup cost. Another problem with fixed stride tries is the high worst case cost for incremental updates. If the data structure is stored in a packed memory area without any efficient mechanisms to move around trie nodes and to manage memory allocation and deallocation, a single update may potentially require that the whole data structure is rebuilt from scratch as with a basic block tree.

SUMMARY OF THE INVENTION

The present invention aims to solve the problems discussed above such as to reduce the worst case storage cost to the optimal w+d bits/key, solve the problem with expensive incremental updates and simultaneously guarantee a bounded worst case lookup cost independently of the number of intervals.

According to a first aspect of the present invention, this is provided by a method of the kind defined in the introductory portion of the description and having the characterizing features of claim 1. In the present invention the method comprises the steps of:

providing in a storage (memory), a datagram forwarding data structure provided for indicating where to forward a datagram in said network, which data structure comprises at least one leaf and possibly a number of nodes including partial nodes, said data structure having a height, corresponding to a number of memory accesses required for lookup in an arbitrary partition comprising n intervals, reducing worst storage cost by using a technique for reduction of worst case storage cost that are selectable from: partial block tree compaction, virtual blocks, bit push pulling, block aggregation or split block trees, and variations thereof, updating the layered data structure partially by using a technique for scheduling maintenance work that are selectable from: vertical segmentation and bucket list maintenance, and providing a hybrid structure by using a technique that are selectable from cluster monitoring, path compression, prefix pointer encoding.

While the illustrations and the description includes static block trees as examples and embodiments thereof, the invention is not limited to a static data structure in the form of a block tree per se, but also comprises other types of static data structures such as so-called "fixed stride tries" or the like.

Herein, a data structure is "static", if updates are accomplished by complete reconstruction, i. e. by building a new data structure from scratch.

Herein, the expression "lookup in an arbitrary partition comprising n intervals", also referred to as "1-dimensional classification", could logically be briefly explained by the following.

(1) "longest prefix matching (i. e. routing lookup) can be reduced to "most narrow interval matching"
(2) "most narrow interval matching" can be reduced to "first interval matching"
(3) "first interval matching" can be reduced to "only interval matching" (i. e. lookup in an arbitrary partition comprising n intervals)

This means that any method for solving (3) can also be used to solve (2) and any method for solving (2) can also be used to solve (1). Another way of explaining this is that (2) is a more general problem than (1) whereas (3) is the most general problem of them all, Note that all methods described in the present invention support "extended search" thus solving (3) (as well as (2) and (1)).

The above method is characterized in that it comprises a technique for reducing worst storage cost, and a technique for scheduling maintenance work that are selectable from: vertical segmentation and bucket list maintenance. The method also comprises using a technique for providing a hybrid structure that is selectable from cluster monitoring, path compression, prefix pointer encoding to provide a static hybrid block tree.

Thus, the method solves the problems discussed above such as to reduce the worst case storage cost to the optimal w+d bits/key and the problem with expensive incremental updates.

According to a second aspect of the present invention, this is provided by a device of the kind defined in the introductory portion of the description and having the characterizing features of claim 12. The device is characterized in that it comprises means for providing in a storage (memory), a datagram forwarding data structure provided for indicating where to forward a datagram in said network, which data structure comprises at least one leaf and possibly a number of nodes including partial nodes, said data structure having a height, corresponding to a number of memory accesses required for lookup in an arbitrary partition comprising n intervals, and means for reducing worst storage cost by using a technique for reduction of worst case storage cost that are selectable from: partial block tree compaction, virtual blocks, bit push pulling, block aggregation or split block trees, and variations thereof, updating the layered data structure partially by using a technique for scheduling maintenance work that are selectable from: vertical segmentation and bucket list maintenance, and providing a hybrid structure by using a technique that are selectable from cluster monitoring, path compression, prefix pointer encoding.

According to a third aspect of the present invention a computer program product is provided, having computer program code means to make a computer execute the above method when the program is run on a computer. The computer program product is directly loadable into the internal memory of a digital computer, characterized in that said product comprises software code means for performing the claimed steps. The computer program product comprises a computer readable medium, characterized in that, on said medium it is stored computer program code means, when it is loaded on a computer, to make the computer performing the claimed steps.

It is appreciated that the computer program product is adapted to perform embodiments relating to the above described method, as is apparent from the attached set of dependent system claims.

According to a fourth aspect of the present invention a system is provided, comprising a device of the kind defined in the introductory portion of the description and as described herein.

Thus, the concept underlying the present invention is to provide an inventive mix of static and dynamic data structures. According to a principal aspect of the present invention, this is provided by combining three techniques: static block tree, bucket list maintenance and vertical segmentation in the resulting block trees thereby obtaining a storage efficient dynamic block tree with lower (bounded) cost for incremental updates.

The benefits of the invention described above is that it can be combined to first construct a static block tree where the worst case amortized storage cost of w+d bits per interval irrespectively of the relation between w, d, and b is reduced. This means that the exact worst case memory requirements for a data structure with n entries (key+data) is known in advance which, in turn, means that it is considerably easier to design a system and to guarantee robust and stable operation at all times. By using the invention, it is also possible to implement efficient incremental updates thereby obtaining a dynamic block tree.

According to an alternative aspect of the present invention hybrid de-amortization is also provided, to provide updating of the hybrid tree The main problem solved by this invention is to achieve a data structure for representing a partition of w-bit intervals where the lookup cost is bounded, as with a fixed stride trie, and where the storage cost at the same time is linear in the number of intervals, as with a block tree.

The invention finds application for routing, forensic networking, fire-walling, qos-classification, traffic shaping, intrusion detection, IPSEC, MPLS, etc and as component in technologies to solve any one of the problems mentioned.

Additional features and advantages of the present invention are disclosed by the appended dependent claims.

BRIEF DESCRIPTION OF THE DRAWINGS

To further explain the invention embodiments chosen as examples will now be described in greater details with reference to the drawings of which.

DESCRIPTION OF EMBODIMENTS OF THE INVENTION

Figure 1A:
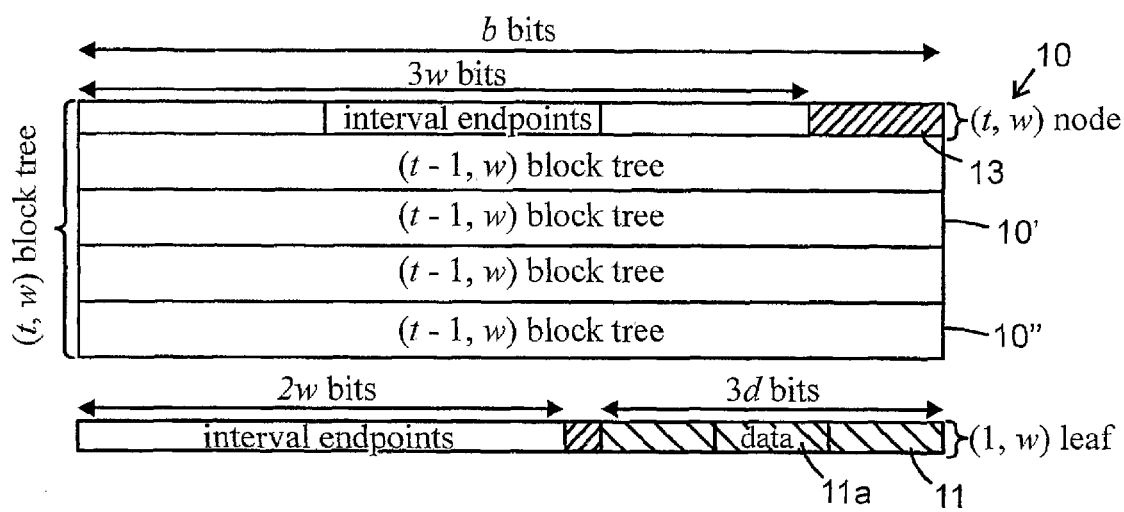
FIG. 1a illustrates a possible organization of a basic block tree.
Figure 1B:
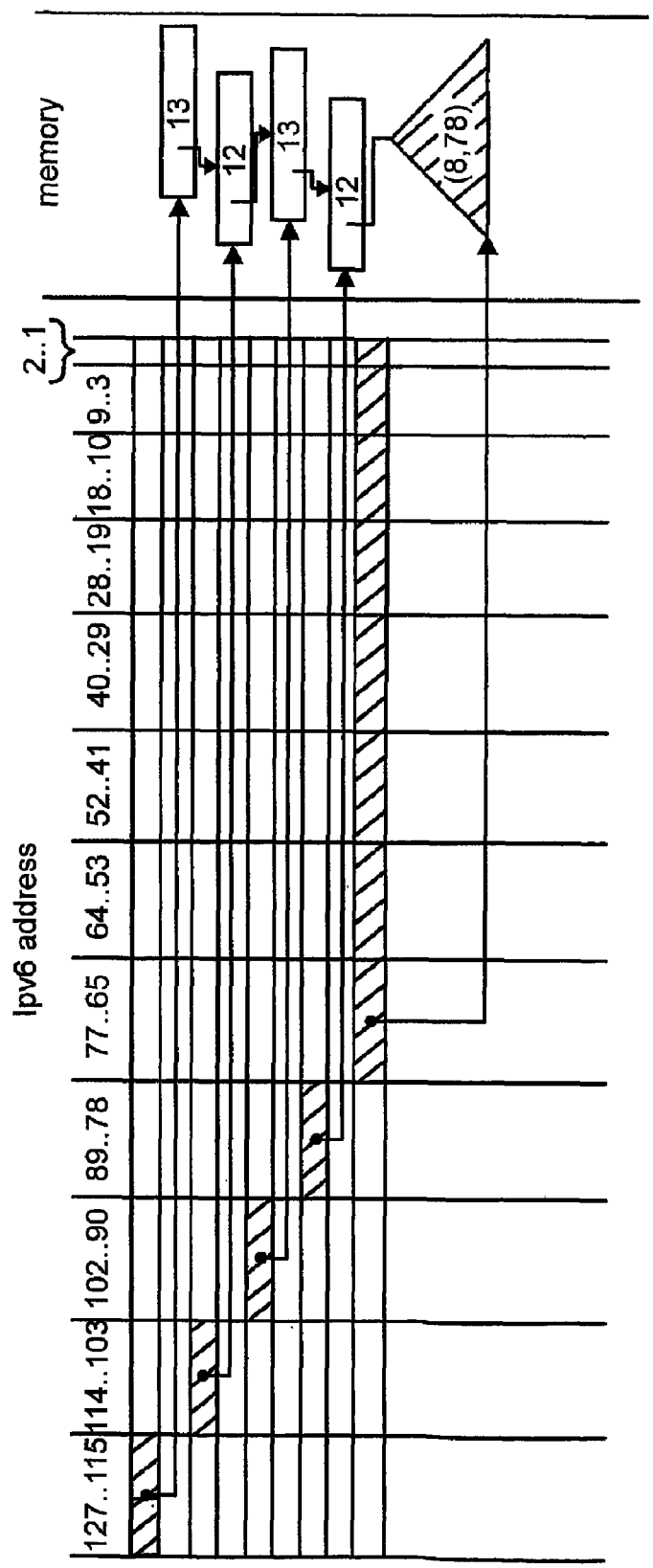
FIG. 1b illustrates an example of a lookup procedure.

Before a detailed discussion of embodiments of the invention is given, the general background of the present invention related to a first part of the present invention, related to how to provide a dynamic block tree (DBT), shall be discussed in more detail with reference to FIG. 1a-b to ease the understanding of the principles of the invention, followed by a detailed description of a first part of an embodiment of the present invention. Thereafter, a second part, related to block trees, but to a Static Hybrid Block Tree (SHBT) shall be discussed in more detail, followed by a detailed description of a second part of the same embodiment as discussed before.

Initially, block trees were introduced to implement an IPv4 forwarding table. A block tree, or more precisely a (t, w) block tree is an O(n) space implicit tree structure for representing a partition consisting of intervals of a set of w-bit non-negative integers. It supports search operations in at most t memory accesses for a limited number of intervals.

A basic block tree 10 is characterized by two parameters: the height, or worst case lookup, cost t and the number of bits b that can be stored in a memory block. To distinguish between block trees with different parameters the resulting structure is typically called "a (t, b)-block tree". Sometimes the parameter t is referred to as the number of levels or the height of the block tree. A complete (1, b)-block tree consists of a leaf and a complete (t, b)-block tree consists of a node followed by b+1 complete (t−1, b)-block trees.

As already disclosed, a basic block tree consists of at least one leaf and possibly a number of nodes if the height t is larger than one. The height t corresponds to the number of memory accesses required for looking up the largest stored non-negative integer smaller than or equal to the query key.

Figure 1C:
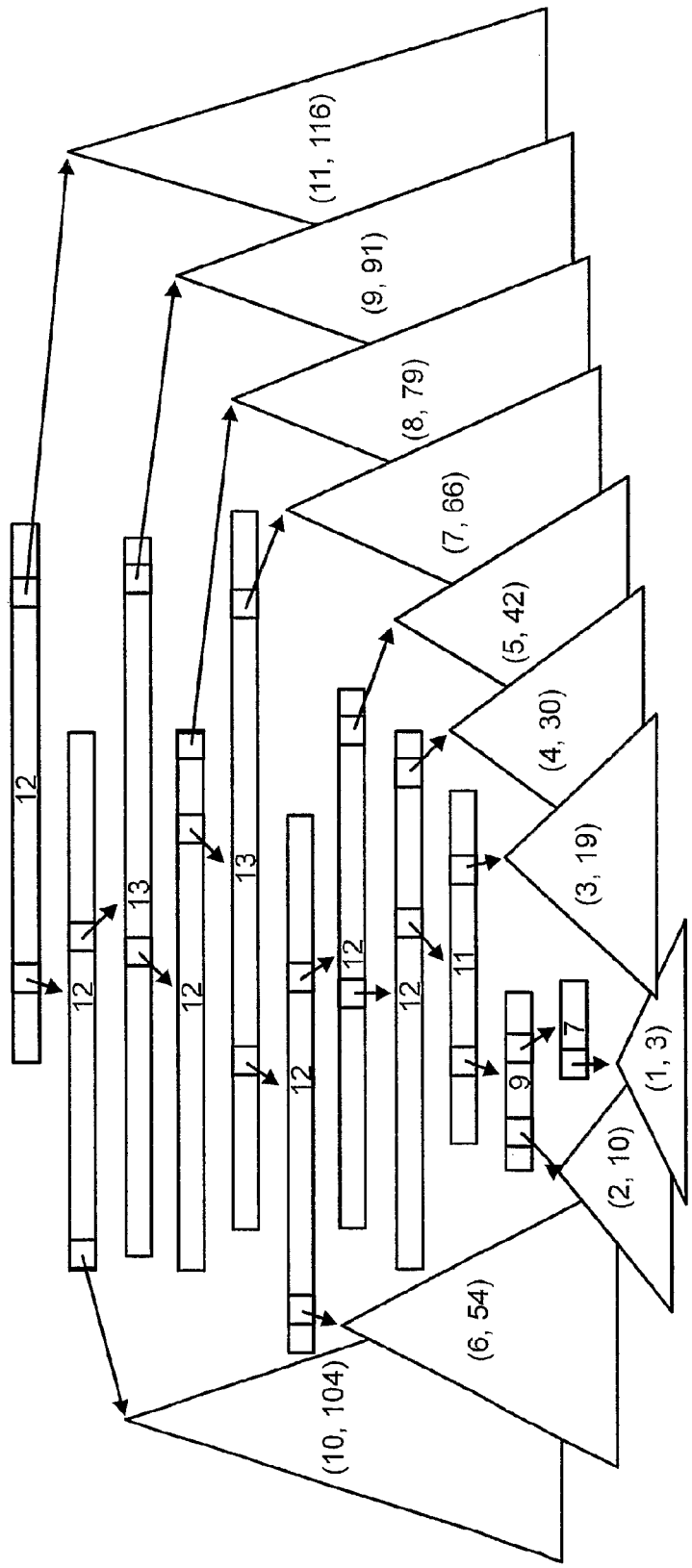
FIG. 1c illustrates a stride.

As mentioned above, a basic block tree 10 is either complete or partial. By a complete basic block tree 10 we mean a block tree where the number of integers stored equals the maximum possible number for that particular height t. That is, a complete basic block tree 10 of height 1 consists of a full leaf 11 and a complete basic block tree of height t larger than 1 consists of a full node 13 and a number of complete basic block trees 10 of height t−1. Each leaf 11 and node 13 is stored in a b-bit memory block. By a full leaf we mean a leaf 11 containing n data fields 11a and n−1 integers where n is the largest integer satisfying $n \cdot D+(n-1) \cdot W < b+1$. By a full node we mean a node 13 containing n integers where n is the largest integer satisfying $n \cdot W < b+1$. Integers stored in each leaf 11 and node 13 are distinct and stored in sorted order to facilitate efficient search. The number of integers stored in a node 13 is denoted by B. FIG. 1b illustrates an example of a lookup procedure, and FIG. 1c illustrates a hybrid data structure, for w=128 and d=16, consisting of a hierarchy of strides (rectangular blocks) and block trees (triangles) according to the configuration 12-12-13-12-13-12-12-12-11-9-7"

Figure 2:
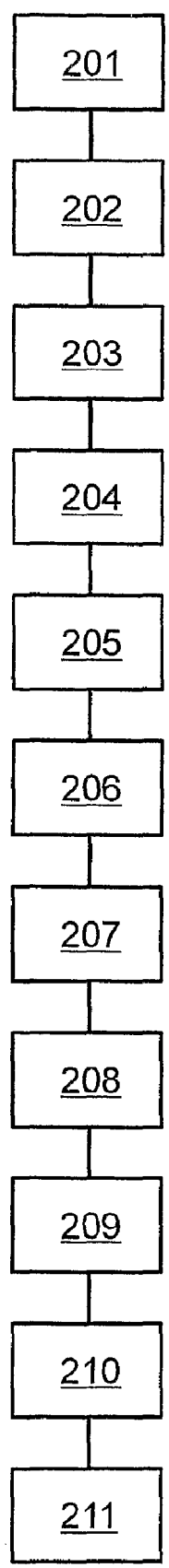
FIG. 2 is a flow-chart showing the method according to an embodiment of the present invention.
Figure 6:
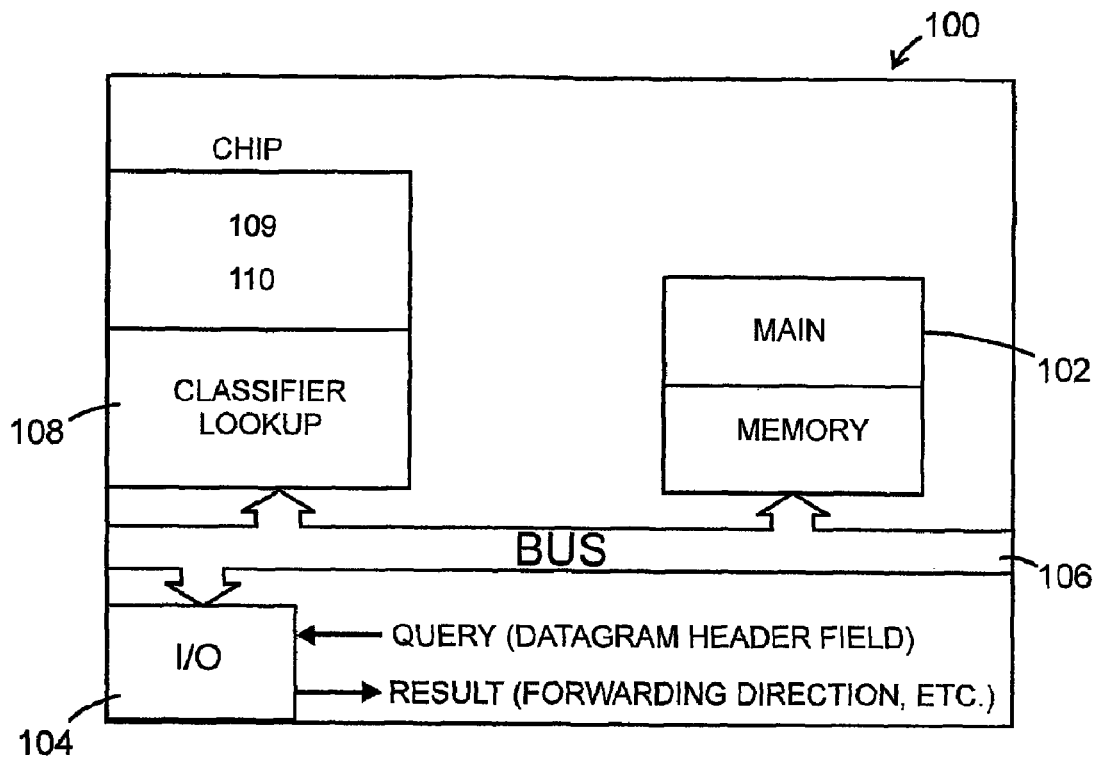
FIG. 6 illustrates the maintenance strategy.

Embodiments of the present invention will now be described with reference to FIGS. 1a, and 2 (and FIG. 6), of which FIG. 2 illustrates the method steps and FIG. 6 illustrates a classifier device according to an embodiment of the invention configured in hardware.

In a first step 201, there is provided in a memory, a datagram forwarding data structure 10 provided for indicating where to forward a datagram in said network. The data structure 10 is in the form of a tree comprising at least one leaf and possibly a number of nodes including partial nodes. As illustrated in FIG. 1a, the data structure 10 has a height h, corresponding to a number of memory accesses required for looking up a largest stored non-negative integer smaller than or equal to a query key. In a second step, 202 worst storage cost is reduced by using a technique for reduction of worst case storage cost that are selectable from: partial block tree compaction, virtual blocks, bit push pulling, block aggregation or split block trees, and variations thereof. In a third step 203, the layered data structure is updated partially by using a technique for scheduling maintenance work that are selectable from: vertical segmentation and bucket list maintenance and a hybrid structure is provided by using a technique that are selectable from cluster monitoring, path compression, prefix pointer encoding to provide a static hybrid block tree.

In another embodiment of the present invention, the technique for reduction of worst case storage cost comprises partial block tree compaction, the latter including the sub-steps of:

storing multiple partial nodes in the same memory block, step 204 storing partial nodes across two memory blocks, step 205 moving partial nodes to under utilized memory blocks higher up in the tree, step 206.

In another embodiment of the present invention, the technique for reduction of worst case storage cost comprises the sub-steps of:

performing compaction at each level, starting at level t, and completing the same when the partial node at level 1 has been compacted, wherein mi is the number of additional elements that can be stored in the partially utilized block at level i and j the level of the next partial node to be compacted, wherein initially, before compaction begins, mi=B−ni for all i=1 . . . t and j=t−1, wherein compaction at level i is performed by repeatedly moving the next partial node to the current memory block, wherein this is repeated as long as nj≦mi, wherein for each node moved, mi is decreased by nj followed by decreasing j by 1, wherein mj has to be decreased to B before decreasing j since moving the node at level j effectively frees the whole block at level j, wherein if mi>0 when compaction halts, some space is available, in the current block, for some of the elements from the next partial node but not for the whole node, wherein the first mi elements from the next partial node are moved to the current memory block, which becomes full, and the last nj−mi elements are moved to the beginning of the next memory block, i.e. the block at level i−1, followed by decreasing mi−1 by nj−mi and increasing mj to B, wherein i is increased by 1 and compaction continues at the next level, wherein the final compacted representation is obtained by repeatedly moving the rightmost node to the leftmost free block until all free blocks are occupied, step 207.

In another embodiment of the present invention, the method comprises the step of providing virtual memory blocks with custom sizes bleaf and bnode for leaves and nodes respectively such that 100% block utilization is achieved, step 208.

In another embodiment of the present invention, the method further comprises the step of emulating memory blocks with some other size than b in order to increase block utilization, wherein nleaf=n (1, w, b, d) and nnode=floor(b/w), in each leaf and node bleaf=b−(nleaf·(d+w)−w) and bnode=b−nnode·w unused bits respectively. If bnode=nnode·((w+d)−bleaf), each leaf below a parent node at level 2, except the last leaf, can be extended to b+(w+d)−bleaf bits by storing (w+d)−bleaf bits in the parent node, step 209.

In another embodiment of the present invention, the method further comprises the step of spending all memory accesses, up to the worst case update cost budget, on each update to achieve preventive service of the data structure and thus postpone the first too expensive update as much as possible, step 210.

In another embodiment of the present invention, the method further comprises the step of spending all memory accesses, up to the worst case update cost budget, on each update to achieve preventive service of the data structure and thus postpone the first too expensive update as much as possible, step 210.

In another embodiment of the present invention, longest prefix matching (i. e. routing lookup) is reduced to most narrow interval matching, and most narrow interval matching is reduced to first interval matching.

In another embodiment of the present invention, the method further comprises the step of amortization of cost, step 211.

All these method steps related to different embodiments of the present invention will be still further described below, but first is referred to FIG. 6, which is an illustration of a block schematic of a classifier device 100 for performing the method, according to an embodiment of the present invention. The classifier device 100 is implemented in hardware and could be referred to as a classifier. The hard-ware implemented device 100 comprises an input/output unit 104 for transmission of data signals comprising data grams to or from a source or destination such as a router or the like (not shown). This input/output unit 104 could be of any conventional type including a cordless gate way/switch having input/output elements for receiving and transmitting video, audio and data signals. Data input is schematically illustrated as "query" of one or more data header field(s), and data output as a result such as forwarding direction, policy to apply or the like. Arranged to communicate with this input/output unit 104 there is provided a system bus 106 connected to a control system 108 for instance including a custom classification accelerator chip arranged to process the data signals. The chip provides, or includes, means for reducing worst storage cost by using a technique for reduction of worst case storage cost that are selectable from: partial block tree compaction, virtual blocks, bit push pulling, block aggregation or split block trees, and variations thereof, and means for updating the layered data structure partially including by using a technique for scheduling maintenance work that are selectable from: vertical segmentation and bucket list maintenance. Typically, the chip 108 could be configured as comprising classifier lookup structure and classifier lookup, typically hardwired.

Figure 7:
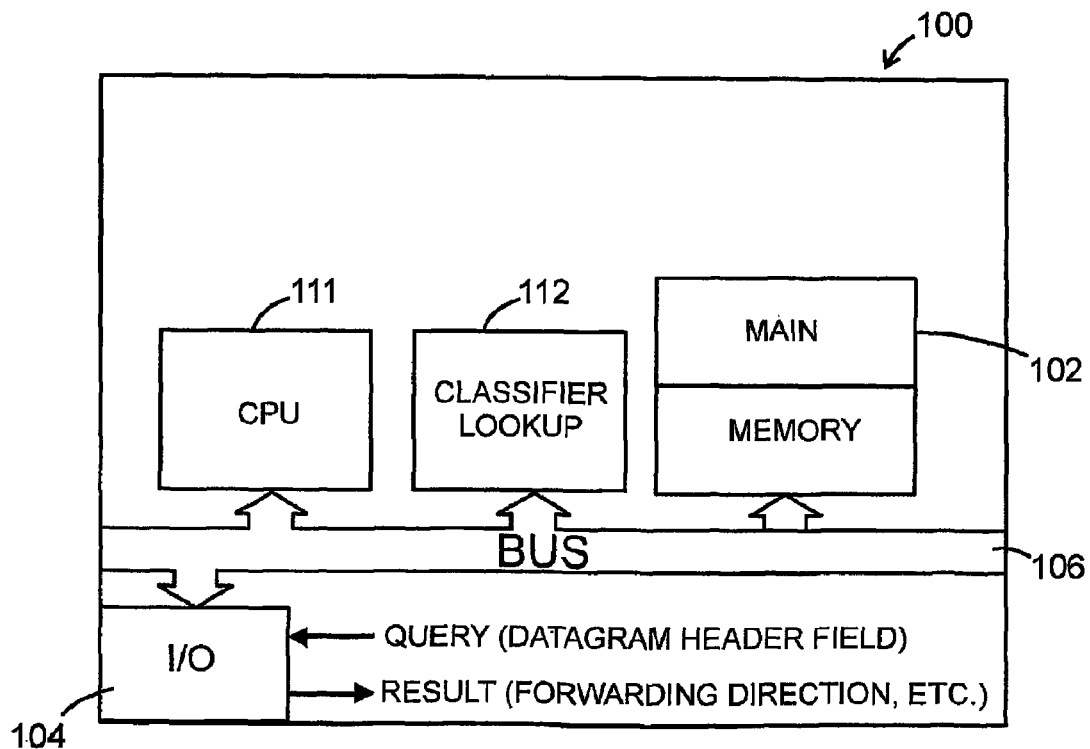
FIG. 7 illustrates a schematic block diagram of a device according to an embodiment of the present invention.

In an alternative embodiment of the present invention, illustrated in FIG. 7, the classifier device 100 is implemented in software instead. To ease understanding, same reference numerals as already have been used in relation to FIG. 6 will be used as far as possible.

Typically, the control system 108 comprises a processor 111 connected to a fast computer memory 112 with a system bus 106, in which memory 112 reside computer-executable instructions 116 for execution; the processor 111 being operative to execute the computer-executable instructions 116 to:

providing in a storage 102, herein typically the main-memory, a datagram forwarding data structure provided for indicating where to forward a datagram in said network, which data structure is in the form of a block tree, or fixed stride trie, comprising at least one leaf and possibly a number of nodes including partial nodes, said data structure having a height, corresponding to a number of memory accesses required for lookup in an arbitrary partition comprising n intervals;

reducing worst storage cost by using a technique for reduction of worst case storage cost that are selectable from: partial block tree compaction, virtual blocks, bit push pulling, block aggregation or split block trees, and variations thereof;

updating the layered data structure partially by using a technique for scheduling maintenance work that are selectable from: vertical segmentation and bucket list maintenance and providing a hybrid structure by using a technique that are selectable from cluster monitoring, path compression, prefix pointer encoding to provide a static hybrid block tree.

The second step 202 will now be described in more detail below, whereby possible techniques for reduction of worst storage cost are described. The techniques could be used separately or in any combination.

Partial Block Tree Compaction

In a complete block tree, all memory blocks are fully utilized in the sense that no additional keys can be stored in each node and no additional pairs of keys and data can be stored in the leaves. The number of memory blocks required for storing the intervals is not affected by the construction of the block tree which merely rearranges the interval endpoints. The resulting data structure is therefore referred to as implicit as the structure is implicitly stored in the ordering between the elements. However, this is not true for a partial block tree. In the worst case, there will be t memory blocks which contain only one interval endpoints. If B>1 this means that the total storage overhead resulting from under utilized memory blocks can be as much as $t \cdot (B-1)$ elements. The resulting data structure can thus not be said to be implicit. If, for some reason, the height must be hard coded irrespectively of n the overhead increases to tB for a degenerated t-level block tree containing zero intervals. To make the whole data structure implicit, partial nodes must be stored more efficiently.

According to an embodiment of the present invention, this could be provided by means of a technique herein called "partial block tree compaction", step 202, which can be used to reduce the storage cost for any partial (t, B)-block tree to the same cost as a corresponding complete block tree. This is achieved by combining three sub-methods:

Multiple partial nodes are stored in the same memory block.

Partial nodes are stored across two memory blocks.

Partial nodes are moved to under utilized memory blocks higher up in the tree.

There is at most one partial node at each level. Furthermore, if there is a partial node at a certain level it must be the rightmost node at that level. Let ni be the number of elements in the rightmost node at level i. The sequence n1, n2, ..., nt is completely determined by n, t, and B. Compaction is performed at each level, starting at level t, and completed when the partial node at level 1 has been compacted. Let mi be the number of additional elements that can be stored in the partially utilized block at level i and j be the level of the next partial node to be compacted. Initially, i.e. before compaction begins, mi=B−ni for all i=1 ... t and j=t−1. Compaction at level i is performed by repeatedly moving the next partial node to the current memory block. This is repeated as long as nj≦mi. For each node moved, mi is decreased by nj followed by decreasing j by 1. Note that we also have to increase mj to B before decreasing j since moving the node at level j effectively frees the whole block at level j. If mi>0 when compaction halts, some space is available, in the current block, for some of the elements from the next partial node but not for the whole node. Then, the first mi elements from the next partial node are moved to the current memory block, which becomes full, and the last nj−mi elements are moved to the beginning of the next memory block, i.e. the block at level i−1. This is followed by decreasing mi−1 by nj−mi and increasing mj to B. Finally, i is increased by 1 and compaction continues at the next level. Compaction may free the rightmost leaf in the block tree but also create up to t−2 empty memory blocks within the block tree. The final compacted representation is obtained by repeatedly moving the rightmost node to the leftmost free block until all free blocks are occupied. In this representation, all memory blocks are fully utilized except one.

According to another embodiment of the present invention an alternative technique, herein called "virtual blocks" could be employed instead of, or in addition to, the one described above.

Virtual Blocks

If the size b of the memory blocks and the size of keys and data fit extremely bad together nodes and/or leaves will contain many unused bits even if the tree is implicit according to the definition above. This problem is referred to as a quantization effect. To reduce quantization effects, we can use virtual memory blocks with custom sizes bleaf and bnode for leaves and nodes respectively such 100% block utilization is achieved. By choosing bleaf and bnode less than or equal to b, we can be sure that a custom block straddles at most one b-block boundary. As a result, the worst case cost for accessing a custom block is two memory accesses and thus the total cost for lookup is doubled in the worst case.

According to yet another embodiment of the present invention, another technique, herein called "bit push pulling could be employed instead or in any combination.

Bit Push-Pulling

Another method for reducing quantization effects without increasing the lookup cost is bit push-pulling. Similarly to virtual memory blocks, the idea behind bit push-pulling is to emulate memory blocks with some other size than b in order to increase block utilization. Let nleaf=n (1, w, b, d) and nnode=floor(b/w). In each leaf and node we have bleaf=b−(nleaf·(d+w)−w) and bnode=b−nnode·w unused bits respectively. If bnode=nnode·((w+d)−bleaf), each leaf below a parent node at level 2, except the last leaf, can be extended to b+(w+d)−bleaf bits by storing (w+d)−bleaf bits in the parent node. In this way, the first nnode leaf blocks as well as the node block becomes 100% utilized. The missing bits from the leaves are pushed upwards to the next level during construction and pulled downwards when needed during lookup, hence the name bit push-pulling. At a first glance it may appear stupid to leave one of the leaves unextended. However, by doing so, we can apply the technique recursively and achieve 100% block utilization for nnode sub-trees of height 2 by pushing bits to the node at level 3. As the number of levels increases, the block utilization in the whole block tree converges towards 100%.

As an example, we can use bit push-pulling to reduce the worst case storage cost for 112-bit keys with 16-bit data and 256-bit memory blocks. For w=104 we have 100% leaf utilization (2·104+3·16=256) but only 87.5% node utilization. We can therefore suspect that the low cost of 128 bits per interval can be reached for some w>104 by some clever modification of the block tree. Consider such a w and imagine a (t, w)-block tree where leafs and nodes are organized in the same manner as for w=104 and for now ignore how this is achieved as we will come to that later. The total number of utilized bits B(t) in our imaginary block tree is defined by the recurrence equation $$B(1)=2w+3\cdot 16$$

$$B(t)=2w+3B(t-1)$$

and the number of blocks is given by s(t, 104) since the organization of nodes and leafs are the same. By solving the equation B(t)=b·s(t, 104) for w we get $$w=3t\cdot(128-16)-128\ 3t-1=112,\ \text{as}\ t\rightarrow\infty.$$

Figure 3:
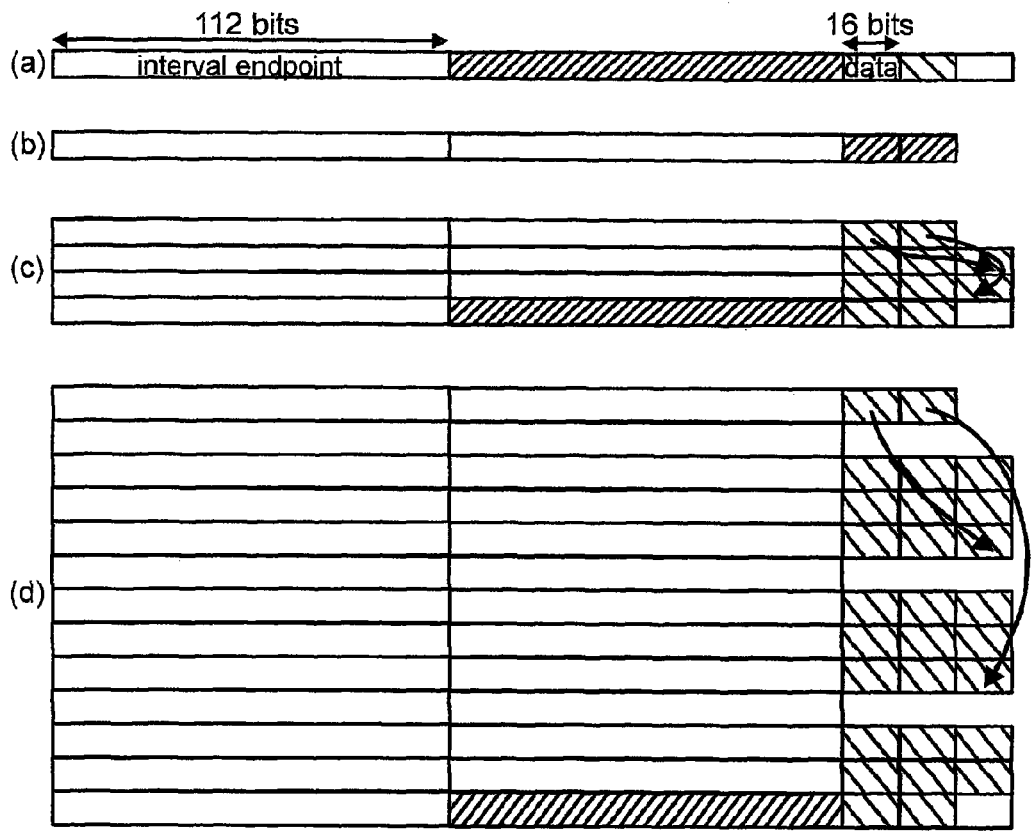
FIG. 3a-d illustrate bit push-pulling technique.

Hence, for w=112, 100% utilization would be achieved and it is therefore meaningless to consider larger values than 112. Let us focus on w=112 and see what can be achieved. FIG. 3(*a*) shows a leaf containing an interval endpoint, two data fields and an area of the same size as the interval endpoint that is unused (black). If we had some additional bits for representing a third data field, the unused bits could be used to represent a second endpoint. The resulting leaf would be organized in the same way as leafs in (t, 104) block trees. Missing bits are shown using dashed lines in the figure. The unused bits in the node illustrated in FIG. 3(b) correspond to two data fields. Each node has three children and hence three leaves share parent node. We can store the missing data fields from two of the leafs in the unused data fields in the node to obtain a tree of height two which is missing space for one data field as shown in FIG. 3(c). In FIG. 3(d), we have applied the technique recursively to create a tree of height three which is also missing space for one data field. Conceptually, we emulate 256+16=272-bit blocks for storing the leaves and 256−2·16=224-bits blocks for storing the nodes. For this to work when all blocks are of size 256 the bits from the leaves are pushed upwards in the tree during construction and pulled downwards if/when needed during lookup. By using this bit push-pull technique we can implement modified (t, 112)-block trees of arbitrary height with utilization that converges to 100%. The maximum number of intervals and maximum relative size are given by bn(t, 112)=bn(t, 104)=3t and c(t, 112)=c(t, 104)=128.

Block Aggregation

The block aggregation technique is simpler and less elegant but can be used together with bit push-pulling. If bnode<nnode·((w+d)−bleaf), we can use block aggregation to construct super leaves and super nodes stored in aleaf·b and anode·b bits blocks respectively. If bleaf and w+d are relatively prime, bleaf can be used as generator and aleaf·bleaf can be used to construct any integer modulo w+d. Otherwise, aleaf=(w+d)/bleaf leaf blocks are combined into one super leaf with 100% utilization. For nodes, the method is similar. If bnode and w are relatively prime, bnode can generate any integer modulo w, 2w, 3w, and so on. In particular, the exact number of unused bits required for bit push-pulling can be generated. Otherwise, anode=w/bnode blocks are combined into a super node with 100% utilization. Bit push-pulling have only positive effect on the lookup performance since the size of the set of intervals we can handle increases without causing additional memory accesses for the lookup. When using block aggregation we can expect a slight increase of the lookup cost since we may have to search large aggregated blocks. However, since an aggregated block can be organized as a miniature block tree and we never need to aggregate more than b blocks, the local lookup cost is ceil(LOG(b^2/w))+1, where LOG is the logarithm with base floor (b/w). Note that we assume that the last memory access (the added 1) straddles a block boundary. Even in the worst case, this is only marginally more expensive than the lookup cost in a non-implicit block tree where block aggregation is not used.

As an example, we can use block aggregation to improving compression for 128-bit keys with 16-bit data stored in 256-bit memory blocks. The cost for using basic block trees is 192 bits per interval—which would be optimal for d=64 bits data—when w>104 and drops to 128 bits per interval when w=104. It would be possible to implement more efficient block trees for w=128 if we could use larger blocks. If we could use 2·128+3·16=304-bit blocks for the leafs while keeping the 256-bit block for the nodes, the maximum relative size of a 128-bit block tree drops to 144 and the ideal compression ratio (=optimal storage cost) is reached. This can be easily achieved in a hardware implementation where the different levels of the block tree are stored in different memory banks that can have different block sizes. However, if we are stuck with 256-bit blocks the only option is to somehow emulate larger blocks. Assume that two memory accesses can be spent for searching a block tree leaf rather than only one memory access. Two blocks can then be combined into a 512-bit superleaf containing three 128-bit interval endpoints and four 16-bit data fields. Of the total 512 bits, we utilize 3·128+4·16=448 corresponding to 81.25% which is an improvement compared to 62.5%. Using the same technique, 768 bit blocks can be emulated with 95.8% utilization and 1024-bit blocks with 100% utilization (7·128+8·16=1024). In a 1024 bits block, we can store 7 keys x1, x2, . . . , x7, where xi<xi+1, and 8 data fields. Searching a superleaf in four memory accesses is straightforward as there are four blocks. To reduce the search cost to three memory accesses we organize the superleaf as follows: the first block contains x3 and x6, the second block contains x1 and x2, the third block contains x4 and x5, and the fourth block contains x7 and the 8 data fields. By searching the first block in one memory access we can determine in which of the other three blocks to spend the second memory access. The third memory access is always spent in the fourth block. We will refer to this data structure as modified (t, 128)-block tree. The maximum number of intervals that can be stored is bn (t, 128)=3t−3·8 and since both nodes and leafs are 100% utilized, the maximum relative size is the ideal c (t, 128)=w+d=144 bits per interval.

Split Block Trees

Consider a collection of small (t, w)-block trees representing n1, n2, . . . , nF intervals. If the maximum relative size for the collection as a whole is too high we can reduce the quantization effects by using split block trees. The idea is to store the block tree in two parts called the head and the tail. The head contains the relevant information from all partially used nodes and leaf and a pointer to the tail which contains complete block trees of height 1, height 2, and so on. The tail consists of memory blocks that are fully utilized and a forest of block trees is stored with all the tails, block aligned, in one part of the memory whereas the heads are bit aligned in another part of the memory. For the collection as a whole, at most one memory block is under utilized. There can be at most one partially used node at each level and at most one partially used leaf. By recording the configuration of the head, the partial nodes and leaf can be tightly packed together (at the bit level) and stored in order of descending height. Moreover, the only requirement on alignment of the head is that the tail pointer and the partial level t node lies in the same memory block. We can then search the partial level t node in the first memory access, the partial level t−1 node in the second, and so on. It does not matter if we cross a block boundary when searching the partial t−i level node since we have already accessed the first of the two blocks and only have to pay for the second access. As a result, the cost for reaching the partial t−i node is at most i memory accesses and we have at least t−i memory accesses left to spend for completing the lookup. If n is very small, e.g. the total number of blocks required for storing the head and the tail is less than t, the quantization effects can be reduced even further by skipping the tail pointer and storing the head and the tail together.

Now, a set of techniques for scheduling maintenance work, corresponding to the third step 203 will be described in more detail.

Vertical Segmentation

To handle large block trees, a technique called vertical segmentation could be implemented, where the tree is segmented into an upper part and a lower part. The upper part consists of a single block tree containing up to M intervals and the lower part consists of up to M block trees where each block tree contains up to N intervals. To keep the overall tree structure reasonably balanced, while limiting the update cost for large n, we will allow reconstruction of at most one block in the upper part plus complete reconstruction of two adjacent block trees in the lower half, for each update.

Bucket List Maintenance

Let $u(M,N)$ be our update cost budget, i.e., the maximum number of memory accesses we are allowed to spend on one update. We consider the data structure to be full when additional reconstruction work would be required to accommodate for further growth. The main principle behind our maintenance strategy is to actually spend all these memory accesses on each update in the hope of postponing the first too expensive update as much as possible.

First, let us present the problem in a slightly more abstract form. Let $B1, B2, \ldots, BM$ be a number of buckets corresponding to the M block trees in the lower part. Each bucket can store up to N items corresponding to N intervals. Let $xi$ be an interval endpoint in the upper tree and $x[i,1], \ldots, x[i, mi]$ belonging to the interval $[x[i-1], x[i]-1]$ be the interval endpoints in the lower tree corresponding to bucket Bi. Clearly, $xi=x[i]$ works as a separator between bucket Bi and bucket $B[i+1]$. Since we are allowed to reconstruct one block in the upper tree and reconstruct two adjacent trees in the lower part, we can replace $xi$ in the upper tree by one of $x[i,1], \ldots, x[i, mi], x[i+1,1], \ldots, x[i+1,mi+1]$ and build two new block trees from scratch from the remaining interval endpoints. This corresponds to moving an arbitrary number of items between two adjacent buckets. When an item is inserted into a full bucket, it fails and the system of buckets is considered full. Only insertions needs to be considered since each delete operation reduces n by 1 while financing the same amount of reconstruction work as an insert operation. The role of a maintenance strategy is to maximize the number items that can be inserted by delaying the event of insertion into a full bucket as much as possible. We perform insertions in a number of phases, where the current phase ends either when a bucket becomes full or when M items have been inserted, whichever happens first. Consider a phase where $m \leq M$ items have been inserted. For each item inserted we can move an arbitrary number of items between two adjacent buckets. This is called a move.

Proposition 10 (a) $m-1$ moves is sufficient to distribute these m items evenly, i.e. one item per bucket, no matter how they were inserted, (b) these $m-1$ moves can be performed after the current phase.

Figure 4:
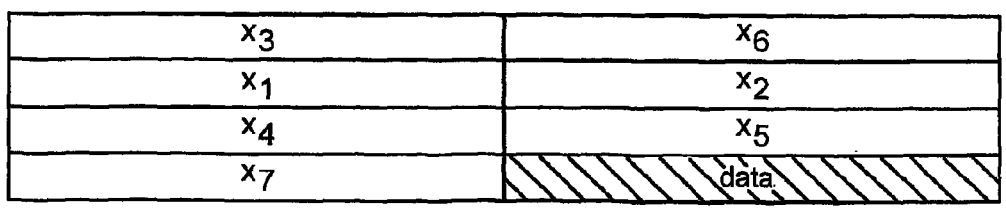
FIG. 4 illustrates a layout of a 1024-bit superleaf.

Initially, we have 0 items in each bucket or equivalently space for $N0=N$ items. Provided that $N \geq M$, M items will be inserted in the first phase. By Proposition 10, these can be evenly distributed among the buckets, by performing the maintenance after the first phase. When the next phase begins, there will be 1 item per bucket or equivalently space for $N1=N0-1=N-1$ additional items. This can be repeated until $Ni=N-i<M$, and the total number of items inserted up to this point is $M \cdot (N-M)$. In phase Ni, the smallest number of elements that can be inserted is $M-1$ if all items falls in the same bucket and in the remaining phases the number of insertions is reduced by 1 in each phase until only one item can be inserted. According to Proposition 10, maintenance can still be performed but only for a limited number of buckets. If we focus maintenance efforts to the buckets where insertions occur we can still guarantee that the available space does not decrease by more than one item for each phase. Hence, an additional $sum(i, i=1 \ldots M)=M \cdot (M+1)/2$ items can be inserted yielding a total of $MN-M \cdot (M-1)/2$ items. For each insertion in the current phase we can perform one move (of maintenance work) for the previous phase. The difference in number of inserted items is at most 1 between the previous and the current phase. By Proposition 10(a), the number of insertions of the current phase is thus sufficient to pay for the maintenance for the previous phase and Proposition 10(b) follows. It remains to prove Proposition 10(a). To distinguish between items that have not been maintained from the previous phase and items being inserted in the current phase we color the items from the previous phase blue and the inserted items red. First consider the case when $m=M$. The maintenance process basically operates on the buckets in a left to right fashion (with an exception). Let Bi be the number of blue items in bucket i, and k the index of the rightmost completed bucket—k is initially zero. We start in rightward mode: Find the leftmost bucket r satisfying $sum(Bj, j=k+1 \ldots r) \geq r-k$. If $r=k+1$, move $Br-1$ (possibly zero) item from bucket r to bucket $r+1$ and increase k by 1 since bucket r is completed. Otherwise ($r>k+1$), set $l=r$ and enter leftward mode. In leftward mode the maintenance process works as follows: If $l=k+1$, k is increased to $r-1$ and we immediately enter rightward mode. Otherwise, $1-(k+1)-sum(Bj, j=k+1 \ldots l-1)$ items are moved from bucket l to bucket $l-1$, and l is decreased by 1. FIG. 4 illustrates how completion of three buckets is achieved in three steps in rightward mode followed by completing four buckets in leftward mode in the last four steps. Switching between rightward and leftward mode is free of charge. For each move performed in rightward mode one bucket is completed. In leftward mode there are two cases. If there is only one move before switching to rightward mode, one bucket is completed. Otherwise, no bucket is completed in the first move but this is compensated by completing two buckets in the last. For each move between the first and the last move one bucket is completed. To summarize this, each move completes one bucket and hence there are $M-1$ buckets that contains exactly 1 blue item each after $M-1$ moves. There are M blue items in total and hence the last bucket must also contain 1 blue item (and is thus also completed). We have proved Proposition 10(a) for $m=M$. If $m<M$, we can use a left to right greedy algorithm to partition the set of buckets into a minimum number of regions where the number of buckets in each region equals the total number of blue items in that region. Some buckets will not be part of a region but this is expected since less than M blue items are available. Within each region we run the maintenance process in exactly the same way as for $m=M$. This concludes the proof of Proposition 10(a) as well as the description and analysis of our maintenance strategy.

Stockpiling

Consider the general problem of allocating and deallocating memory areas of different sizes from a heap while maintaining zero fragmentation. In general, allocating a contiguous memory area of size s blocks is straightforward—we simply let the heap grow by s blocks. Dellocation is however not so straightforward. Typically, we end up with a hole somewhere in the middle of the heap and a substantial reorganization effort is required to fill the hole. An alternative would be to relax the requirement that memory areas need to be contiguous. It will then be easier to create patches for the holes but it will be nearly impossible to use the memory areas for storing data structures etc. We need a memory management algorithm which is something in between these two extremes. The key to achieve this is the following observation: In the block tree lookup, the leftmost block in the block tree is always accessed first followed by accessing one or two additional blocks beyond the first block. It follows that a block tree can be stored in two parts where information for locating the second part and computing the size of the respective parts is available after accessing the first block. A stockling is a managed memory area of s blocks (i.e. b bits blocks) that can be moved and stored in two parts to prevent fragmentation. It is associated with information about its size s, whether or not the area is divided in two parts and the location and size of the respective parts. Moreover, each stockling must be associated with the address to the pointer to the data structure stored in the stockling so it can be updated when the stockling is moved. Finally, it is associated with a (possibly empty) procedure for encoding the location and size of the second part and the size of the first part in the first block. Let ns be the number of stocklings of size s. These stocklings are stored in, or actually constitutes a, stockpile which is a contiguous sns blocks memory area. A stockpile can be moved one block to the left by moving one block from the left side of the stockpile to the right side of the stockpile (the information stored in the block in the leftmost block is moved to a free block at the right of the rightmost block). Moving a stockpile one block to the right is achieved by moving the rightmost block to the left side of the stockpile. The rightmost stockling in a stockpile is possibly stored in two parts while all other stocklings are contiguous. If it is stored in two parts, the left part of the stockling is stored in the right end of the stockpile and the right end of the stockling at the left end of the stockpile. Assume that we have c different sizes of stocklings $s1, s2, \ldots, sc$ where $si > si+1$. We organize the memory so that the stockpiles are stored in sorted order by increasing size in the growth direction. Furthermore, assume without loss of generality that the growth direction is to the right. Allocating and deallocating a stockling of size si from stockpile i is achieved as follows:

Allocate si.

Repeatedly move each of stockpiles $1, 2, \ldots, i-1$ one block to the right until all stockpiles to the right of stockpile i have moved si blocks. We now have a free area of si blocks at the right of stockpile i. If the rightmost stockling of stockpile i is stored in one piece, return the free area. Otherwise, move the left part of the rightmost stockling to the end of the free area (without changing the order between the blocks). Then return the contiguous si blocks area beginning where the rightmost stockling began before its leftmost part was moved.

Deallocate si.

Locate the rightmost stockling that is stored in one piece (it is either the rightmost stockling itself or the stockling to the left of the rightmost stockling) and move it to the location of the stockling to be deallocated. Then reverse the allocation procedure.

Figure 5A:
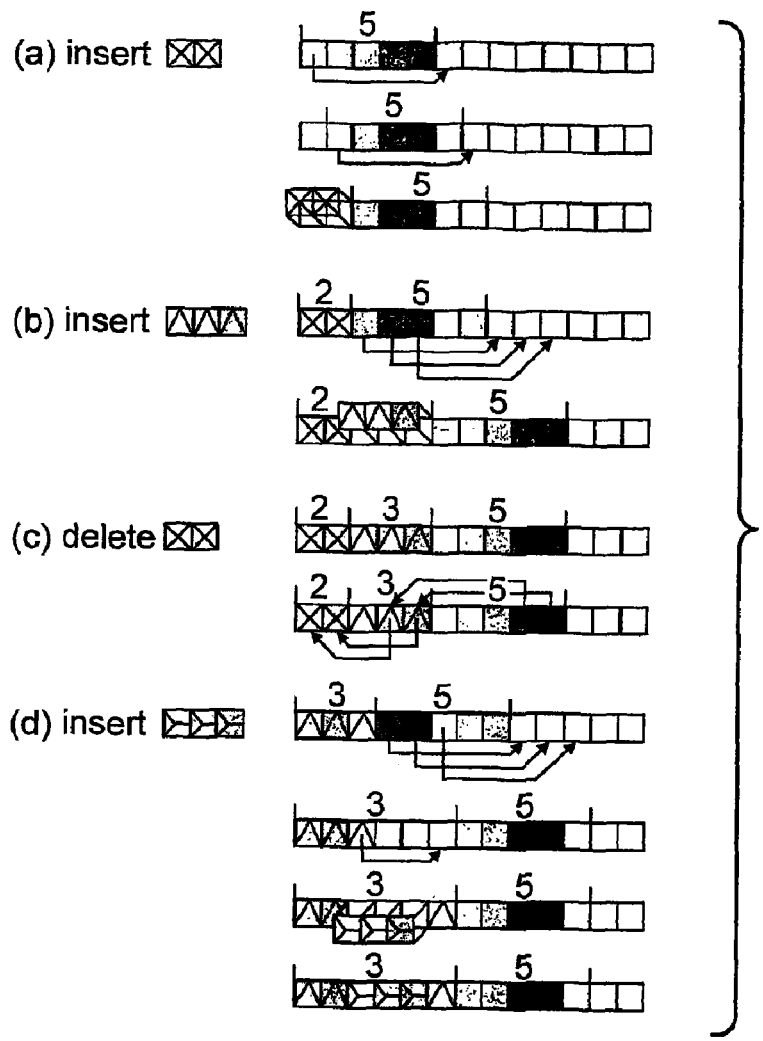
FIG. 5a illustrates stockpiling and 5b the maintenance strategy.

In FIG. 5a, we illustrate the stockpiling technique in the context of insertion and deletion of structures of size 2 and 3 in a managed memory area with stockling sizes 2, 3 and 5. Each structure consists of a number of blocks and these are illustrated by squares with a shade of grey and a symbol. The shade is used to distinguish between blocks within a structure and the symbol is used to distinguish between blocks from different structures. We start with a 5-structure and then in (a) we insert a 2-structure after allocating a 2-stockling. Observe that the 5-structure is stored in two parts with the left part starting at the 6th block and the right part at the 3rd block. In (b) we allocate and insert 3 blocks and as a result, the 5-structure is restored into one piece. A straightforward deletion of the 2-structure is performed in (c) resulting in that both remaining structures are stored in two parts. Finally, in (d) a new 3-structure is inserted. This requires that we first move the 5-structure 3 blocks to the right. Then, the left part (only the white block in this case) of the old 3-structure is moved next to the 5-structure and finally the new 3-structure can be inserted. The cost for allocating an si stockling and inserting a corresponding structure is computed as follows. First, we have to spend $(i-1) \cdot si$ memory accesses for moving the other stockpiles to create the free space at the end of the stockpile. We then have two cases: (i) Insert the data structure directly into the free area. The cost for this is zero memory accesses since we have already accessed the free area when moving the stockpiles (insertion can be done simultaneously while moving the stockpiles). (ii) We need move the leftmost part of the rightmost stockling. However, it occupies an area which will be overwritten when inserting the data structure. Therefore, we get an additional si memory accesses for inserting the data structure. For deallocation, we get an additional cost of si memory accesses since we may need to overwrite the deleted stockling somewhere in the middle of the stockpile. We also need to account for the cost for updating pointers to the data structures that are moved. Since the stockpiles are organized by increasing size, at most one pointer needs to be updated for each stockpile moved plus two extra pointer updates in the current stockpile. It follows that the cost for inserting a si blocks data structure when using stockpile memory management is $isi+(i-1)+2 = isi+i+1$ memory accesses and the cost for deletion is $(i+1) \cdot si+(i-1)+2 = (i+1) \cdot si+i+1$ memory accesses.

Stockpiling can be used also if it is not possible to store data structures in two parts. In each stockpile, we have a dummy stockling and ensure that it is always the dummy stocklings that are stored in two parts after reorganization.

As an example of how stockpiling is used together with bucket list maintenance and vertical segmentation, we show how to design a dynamic (12, 128)-block tree. To implement the upper part of a vertically segmented (12, 128)-block tree we use a standard (5, 128)-block tree, i.e., without superleafs, with p bits pointers instead of d bits data. For the lower part we choose modified (7, 128)-block trees. The total lookup cost for the resulting data structure is still 12 memory accesses. For this combination, we have $N = n(5, 128) = 162$, $M = n(7, 128) = 648$ and the total number of intervals we can store is 91935.

By using stockpiling we can limit the cost for insertion and deletion of an ai-block structure to at most $iai+i+1$ memory accesses and $(i+1) \cdot ai+i+1$ memory accesses, respectively, where $a1 > a2 > \ldots > ak$ are the different allocation units available. In our case, the maximum allocation unit is $s(7, 128) = 364$ blocks and assuming that we require maximum compression, we must use 364 different allocation units. As a result, $ai = 364-(i-1)$ and the worst-case cost for inserting an $a182 = 364-(182-1) = 183$-block structure is 33489 memory accesses. To reduce the memory management overhead we must reduce the number of allocation units. This is achieved by decreasing the compression ratio. When using vertical segmentation, we waste 128 bits in each leaf in the upper part for storing pointers and some additional information that is required when using Stockpiling. By using these bits we can also store the variables k, r, and l required for running the maintenance of each block tree in the lower part in-place. The total cost for this is $162 \cdot 128 = 20736$ bits which is amortized over 91935 intervals yielding a negligible overhead per interval. Hence, the maximum relative size is roughly 144 bits per intervals also with vertical segmentation. Suppose that we increase storage by a factor of C, for some constant $C > 1$. We can then allocate (and use) 364 blocks even if we only need A blocks, provided that $AC \geq 364$. Furthermore, we can skip all allocation units between A-1 and 364. By applying this repeatedly, we obtain a reduced set of allocation units where $ai = \text{ceil}(a1/C^{(i-1)})$. To further demonstrate this, we choose $C=2$, which corresponds to a 100% size increase, and perform a thorough worst-case analysis of the update cost. The first step is to compute the set of allocation units and the insertion and deletion cost for each allocation unit (see Table 9). Before investigating the worst-case update cost, we observe that $364+730 = 1094$ memory accesses is a lower bound on the update cost which is independent of C. This is a result from simply reconstructing one 364-block structure without involving the memory manager and simultaneously de-allocating the other 364-block structure at a cost of 730 memory accesses. For our particular choice of C, an additional 367 memory accesses for allocating a 182-block structure must be added to the lower bound resulting in an actual lower bound of 1461 memory accesses. In the worst-case, an insertion of one allocation unit and a deletion of another is required for both block trees. However, not all combinations of insertion and deletion costs are possible. The first observation is that deleting of one allocation unit is followed by inserting the next smaller or the next larger allocation unit. We can also exclude the combinations where the size of the deleted allocation unit from one block tree is the same as the inserted allocation unit from the other block tree as this eliminates one deallocation cost. By comparing costs for the remaining combinations in the table above, we find that the worst-case occurs when deleting a 364-block and a 91-block structure and inserting two 182-block structures resulting in a total cost of 730+368+2·367=1832 memory accesses. Adding the single memory access required for updating the upper part yields a total worst-case incremental update cost of 1833 memory accesses for a 100% size increase. To provide a better understanding of the possible trade-offs between compression ratio and guaranteed update costs we have performed these computations for various values of C and the result are presented in Table 10. These figures should be compared with 134322 memory accesses which is the update cost obtained for C=1. Also note that for $C \geq 3.31$, the worst-case update cost equals the general lower bound computed above plus the cost for allocating an a2-blocks structure.

TABLE 9

Insertion and deletion costs for the different allocation units obtained for C = 2.

| | i | | | | | | | | | |
|---|---|---|---|---|---|---|---|---|---|---|
| | 1 | 2 | 3 | 4 | 5 | 6 | 7 | 8 | 9 | 10 |
| $a_i$ | 364 | 182 | 91 | 46 | 23 | 12 | 6 | 3 | 2 | 1 |
| $icost_i$ | 366 | 367 | 277 | 189 | 121 | 79 | 50 | 33 | 28 | 21 |
| $dcost_i$ | 730 | 549 | 368 | 235 | 144 | 91 | 56 | 36 | 30 | 22 |

TABLE 10

Relation between storage and update costs.

| C | Worst-case update cost |
|---|---|
| 1.1 | 6537 |
| 1.25 | 3349 |
| 1.5 | 2361 |
| 1.75 | 2049 |
| 2 | 1833 |
| 2.5 | 1561 |
| 3 | 1393 |
| 4 | 1280 |

Now, the second part, of the method according to an embodiment of the present invention will be described, starting with a discussion of hybrid block trees.

To better understand these techniques we will describe them in the context of a configuration of a hybrid data structure where they are applied. However, the techniques are general and can as such be applied to any configuration to implement fast incremental updates in a hybrid tree structure consisting of tries nodes and block trees or any similar constructs. The configuration used throughout this description is referred to as the "current configuration" and is presented in the table below. Besides the key sizes and strides for each level it also contains some additional information about the maximum number of intervals that can be stored in each respective static hybrid block tree as well as the corresponding information for the upper and lower parts of the block trees that are stored using vertical segmentation (split block trees).

TABLE 11

Vertically segmented block trees computed by Strider.

| | | | | Upper part | | | Lower part | | |
|---|---|---|---|---|---|---|---|---|---|
| t | w | k | n̂ | t | n | s | t | n | s |
| 12 | 128 | 13 | 91935 | 5 | 162 | 121 | 7 | 648 | 364 |
| 11 | 115 | 12 | 33561 | 4 | 54 | 40 | 7 | 648 | 364 |
| 10 | 103 | 13 | 37935 | 4 | 54 | 40 | 6 | 729 | 364 |
| 9 | 90 | 12 | 12969 | 3 | 18 | 13 | 6 | 729 | 364 |
| 8 | 78 | 13 | 35736 | 3 | 48 | 21 | 5 | 768 | 341 |
| 7 | 65 | 12 | 9150 | 2 | 12 | 5 | 5 | 768 | 341 |
| 6 | 53 | 12 | 7395 | 2 | 15 | 6 | 4 | 500 | 156 |
| 5 | 41 | 12 | 6854 | 1 | 4 | 1 | 4 | 1715 | 400 |
| 4 | 29 | 10 | 1938 | 1 | 4 | 1 | 3 | 486 | 91 |
| 3 | 19 | 9 | 1372 | 3 | 1372 | 211 | | | |
| 2 | 10 | 7 | 260 | 2 | 260 | 27 | | | |
| 1 | 3 | | 8 | 1 | 13 | 1 | | | |

Consider a t-level substructure in a larger hybrid data structure. For a given configuration, the size of the subuniverse w=w(t) represented by the substructure is uniquely determined by t. If the substructure is a (t, w)-block tree, the maximum number of intervals $\hat{n}=\hat{n}(t)$ that can be stored, when modifications and vertical segmentation are taken into account, is also determined by t and the current configuration. Otherwise, the sequence of strides, from the current level down, is given by kt, kt−1, . . . , and so on.

Define the concept φ-cluster to be a collection of w-bit intervals with a common prefix of length w(t)−w(φ), referred to as the prefix of the φ-cluster. The number of intervals in the cluster is referred to as its size. A φ-cluster is said to be dense if the size is larger than $\hat{n}(\phi)$ and sparse otherwise. Clusters form a hierarchy of ancestors where each φ-cluster is a parent of 2kφ (φ−1)-clusters.

In a static hybrid data structure, a kφ-stride is constructed if and only if: (a) the corresponding φ-cluster is dense and (b) the parent (φ+1)-cluster is also dense. If this approach is used in a dynamic hybrid data structure, a single update operation may cause a domino effect where a complete hierarchy of strides needs to be constructed (or destroyed) resulting in a considerable worst-case update cost. To obtain a dynamic hybrid data structure, we simply drop requirement (b).

Cluster Monitoring

To make all of this work, we need to monitor all φ-clusters and immediately construct a kφ-stride when a φ-cluster changes from sparse to dense. Furthermore, we must avoid that a single update causes more than one sparse cluster from becoming dense and vice versa. This is achieved by dynamically adjusting the limits, i.e. the ^n's, throughout the data structure. The size of such an adjustment is limited by the maximum depth of cluster hierarchy which is 12 in our current configuration.

Path Compression

A sparse φ-cluster, without dense ancestor clusters, in a t level substructure is hosted by a (t, w)-block tree. When the φ-cluster becomes dense, the whole cluster is extracted from the (t, w)-block tree and stored in a separate substructure rooted by a kφ-stride.

By collecting intervals with a common prefix we effectively achieve path compression in the block tree structure.

Prefix Pointer Encoding

To prevent the data structure from falling apart, a reference to this separate substructure must be encoded in the (t, w)-block tree. This is achieved by storing the prefix of the φ-cluster together with a pointer to the kφ-stride in a node vφ in the (t, w)-block tree. The choice of vφ is crucial for this prefix pointer encoding scheme to work. It must be located at least at height φ+1 from the bottom of the block tree to ensure that the depth of the substructure as a whole, including the φ-level separate substructure, does not exceed t. At the same time, vφ should be located sufficiently low to ensure that size of the φ-cluster is at least as large as a full sub-block tree of node vφ. Given these two degrees of freedom, it is possible to combine all possible φ-clusters and (t, w)-block trees from our current configuration.

Except for 2 and 3-clusters, we can also store the prefix of the φ-cluster as well as the pointer in the space of the node that would otherwise occupy a range boundary. By using this technique, we can represent a stride pointer using at least 30 bits and since the strides are 32-byte aligned this is sufficient for a 34 gigabyte data structure. To handle 2- and 3-clusters we encode the prefix of the cluster above level 4 and 5 respectively and the pointer one level below. An alternative approach is to exploit the fact that a 2- or 3-cluster is sufficiently large to replace m sub-block trees of a (t, w)-block tree, for some m>1, and then use mw bits to represent the prefix and pointer.

By combining all of these techniques we obtain a dynamic hybrid data structure according to the present invention. The technique of monitoring as well as managing the density of φ-clusters and constructing strides immediately when a φ-cluster becomes dense will effectively de-amortize the work for constructing strides. Furthermore, the method for encoding φ-cluster prefix and pointer in block tree nodes provides an efficient path compression mechanism for block trees, especially when w(t)−w(p) is large. This also increases the overall compression ratio when there are lots of dense clusters. As an example we have calculated that approximately 80 bits per interval is saved for each interval in a dense 4-cluster (w(4)=30) compared to a (11, 116)-block tree. Since there is at least 4374 intervals in a dense 4-cluster approximately 43 kB of memory is saved for each dense 4-cluster in a (11, 116) block tree. These savings creates additional degrees of freedom. As an example of how we can exploit this we deal with a problem related to (12, 128) -block trees that have been swept under the rug until now. When a φ-cluster, hosted by a vertically segmented (12, 128)-block tree, becomes dense, a pointer is encoded in one of the nodes in the upper part (except for φ≦3). If the block tree contains less than ⅔ of the maximum number of intervals one half of the root node is available for encoding one (prefix, pointer) pair. Otherwise, nodes are fully utilized making it impossible to encode in a node, in the upper part, whether it contains interval endpoints or (prefix, pointer)-pair. Therefore, we would like to get rid of the (12, 128)-block tree as soon as possible. Fortunately, as soon as a φ-cluster, where φ>3, becomes dense we save over 137 kbits of memory by compressing it in a separate structure. When combined with amortization, which pays for ⅔ of the stride (since the tree is ⅔ full), this is more than enough to finance and build the initial 13-stride 30000 intervals before we could otherwise afford it.

According to an alternative embodiment of the present invention, yet another technique could be employed to provide updating of the hybrid tree.

Hybrid De-Amortization

In this section we address the actual reconstruction work that must be conducted when a φ-cluster hosted by a hybrid (t, w)-block tree becomes dense and the kφ-stride is constructed. To simplify the discussion, we will reason about this in terms of insertion, growth and construction as opposed to deletion, shrinking and destruction. The strategy developed, as well as all operations, criteria etc. can be run in reverse to handle deletions. Furthermore, to ensure that we actually capture the worst-case update cost, all costs used in our calculations constitutes the worst-case between growth and shrinking.

Typically, there are three procedures involved:

Stride construction. Memory for the kφ-stride must be allocated followed by constructing the stride.

Host reconstruction. The remains of the hybrid (t, w)-block tree after extraction must be reconstructed.

Extract conversion. The extracted structures must be converted from hybrid (t, w)-block tree fragments to a set of hybrid (φ−1,w(φ)−kφ)-block trees.

The maximum cost, including memory management, for stride construction in our configuration is 2050 memory accesses (deallocation cost for a 13-stride).

Before continuing with host reconstruction we make a general observation related to the presence of dense clusters. In our configuration, the smallest cluster (of interest) is the 2-cluster. The size of a dense 2-cluster is at least 261 intervals and it follows that the minimum size of any dense φ-cluster, in our configuration, is at least 261 intervals. No matter if we perform a reconstruction, or conversion, the presence of every dense φ-cluster (irrespectively of φ) let us manage at least 261 intervals as a chunk by merely managing a (prefix, pointer)-pair. In the previous section, we have discussed how the presence of dense clusters can create additional degrees of freedom that can be used to play with the compression ratio. Clearly, dense clusters will also save reconstruction work and in the following discussion and cost analysis we can therefore assume that no dense cluster is present.

Figure 5B:
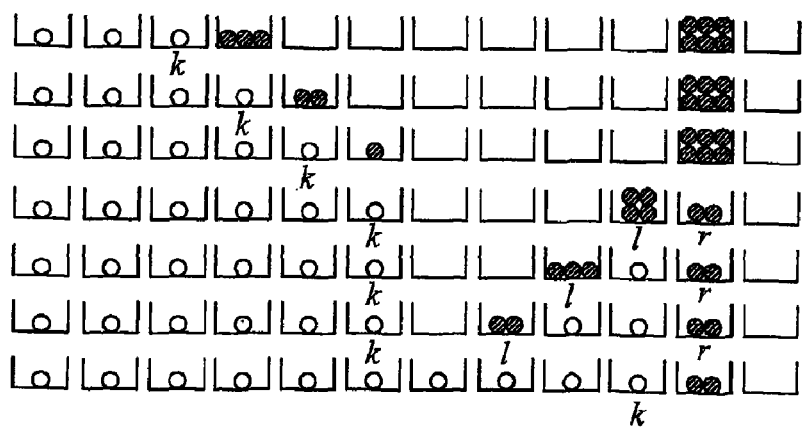

From the point of view of the hybrid (t, w)-block tree, some substructures are partially constituted by the φ-cluster (FIG. 5(a)) and, if vertical segmentation is used, some substructures may be completely constituted by the p-cluster (FIG. 5(b)). We refer to these structures as partial and complete fragments respectively. To extract the φ-cluster, all complete fragments are first removed by removing their references from the upper part. The cost for this is bounded by the size of the upper part and is thus limited to 121 memory accesses as shown in Table 6. This is followed by extracting the fragments from the partial structures and reconstruct the remains. There can be at most two such subtrees, if vertical segmentation is used, and after removal of all complete structures these will be adjacent. Thus, the cost for reconstruction can not be worse than the cost for block tree growth which is 3228 memory accesses. We then get a total of 3228+121=3349 memory accesses for extraction.

It remains to convert the extracted (t, w)-block tree fragments to a set of hybrid (φ−1, w(φ)−kφ)-block trees that will be located below the φ-stride. To obtain a limited update cost, we want to postpone this conversion as much as possible. This means that we must first identify the minimum amount of construction that needs to be done immediately and then develop a strategy for catching up with the postponed construction work.

Our largest stride consists of 213=8192 pointers and thus a completed conversion may result in 8192 different substructures. When stockpiling is used, the relative memory management overhead, i.e. overhead per interval, increases when the size of substructures decreases. Therefore, the total memory management overhead for a complete conversion is way too expensive and must be amortized over several updates. In the first step of the conversion, we construct a minimal set of hybrid (ϕ, w(ϕ))-block trees (instead of (ϕ−1, w(ϕ))−kϕ)-block trees which is the ultimate goal) and let several pointers in the ϕ-stride refer to each of these (ϕ, w(ϕ))-block trees. If the (t, w)-block tree is vertically segmented and if any complete substructures have been extracted, these are represented as (t, w)-block trees but can serve as (ϕ,w(ϕ))-block trees for now. The cost for postponing conversion, and thus also the storage savings that are required to finance the stride, is bounded by max (ki)=13 bits per interval. Adding this to the previous bound of 187.78 bits per interval yields a projected maximum relative size of 200.78 bits per interval for the whole data structure.

Furthermore, the presence of complete substructures implies that the depth of the data structure is sufficient to represent the (ϕ,w(ϕ))-block trees using vertical segmentation. The cost for this is then limited to the construction of a minimal number p of upper parts of (ϕ,w(ϕ))-block trees. Clearly, the cost for this depends on μ and, in turn, μ depends on w(ϕ). To understand this, we must recall the definition of dense cluster. A ϕ-cluster is dense if the size is larger than n(ϕ) which means that the intervals can not be stored in a (ϕ, w(ϕ))-block tree. For each node, in such a block tree, there are floor(b/w(ϕ)+1 sub-trees. In effect, the ϕ-stride replaces the root node thereby increasing the possible number of sub-trees beyond floor(b/w(ϕ)+1. Hence, it is sufficient to partition the cluster into μ(ϕ)=floor(b/w(ϕ)+2 substructures. This line of reasoning can also be applied to (ϕ,w(ϕ))-block trees represented without vertical segmentation which needs to be chopped up into floor(b/w(ϕ)+2 sub-trees. We have made extensive calculations, which have to be left out due to space restrictions, of the worst-case costs for these operations and obtained a pessimistic estimate of 2500 memory accesses for chopping up a (3, 19)-block tree. However, this occurs in combination with a 7-stride where the costs is limited to 266 memory accesses. The worst-case cost for the vertical segmentation case is less than 1500 memory accesses but this may occur in combination with a 13-stride yielding a total cost of 3550 memory accesses. It remains to account for the construction of one or two (ϕ, w(ϕ))-block tree from the two possible partial substructures. The cost for this is tightly connected with the cost for extraction. We start with two (t,w)-block trees. Some intervals from each of these trees belong to the -cluster. When these are extracted, and one or two (ϕ, w(ϕ))-block trees are constructed, they will be stored more efficiently. If the result is two (ϕ, w(ϕ))-block trees, the remaining intervals in the two (t, w)-block tree can be stored in a single tree. Hence, the total cost cannot exceed the cost for converting two (t, w)-block trees to three (t, w)-block trees without changing the set of involved intervals. Thus the additional cost for partial structures is bounded by the worst-case deallocation cost which is 996 memory accesses.

In total, we have a stride construction cost of 2050 memory accesses, an extraction cost of 3349 memory accesses and an immediate conversion cost of 3550+996 memory accesses, including the cost for the stride. Assuming that the remaining conversion can be postponed, we get a total worst-case update cost of at most 3349+3550+996=7895 memory accesses. It remains to show that we actually can postpone the remaining conversion work. The cost for block tree growth is at most 3228 memory accesses.

For each such update, we can spend an additional 7895−3228=4667 memory accesses to catch up with possible conversion work that have been postponed. Assume that we have a newly constructed kt-stride (for some t) where the conversion work have been postponed. Initially, each pointer in the kt-stride refers to a hybrid (t, w)-block tree. Further assume that we spend these 4667 memory accesses for each update that occurs in such a hybrid (t, w)-block tree, unless the update occurs in a dense ϕ-cluster. Then, for each update, we can afford to extract and complete one or more hybrid (t−1, w−kt)-block trees from one of the hybrid (t, w)-block tree. To avoid building up a hierarchy of incompletely converted structures we combine two techniques. By dynamically adjusting the limits (the ˆns), as described above, we can ensure that any ϕ-cluster that would be on the verge of becoming dense becomes dense before the kt-stride is constructed. This will initially guarantee that none of the hybrid (t, w)-block trees is hosting a ϕ-cluster on the verge of becoming dense. We can prolong this guarantee, throughout the existence of the data structure, by prioritizing completion of hybrid (t−1, w−kt)-block, which contains ϕ-cluster on the verge of becoming dense.

Based on this discussion, we conclude that we can in fact postpone conversion in the desired manner and as a result, we have reduced the worst-case incremental update cost from approximately 90000 memory accesses to only 7895 memory accesses at the cost of increasing the maximum relative size from 144 bits per interval to 201 bits per interval.

Stride Compartmentalization and Root Node Integration

In the previous section, we described how a ϕ-cluster, hosted by a hybrid (t, w)-block tree, is handled when it becomes dense. In general, it is possible to convert the parts from the block tree to a minimum number of a set of hybrid (cp−1, w(ϕ))−kϕ)-block trees, that will be located below the ϕ-stride, by first constructing a minimal set of hybrid (ϕ, w(ϕ))-block trees (instead of (ϕ−1, w(ϕ))−kϕ)-block trees which is the ultimate goal), and let several pointers in the ϕ-stride refer to each of these (ϕ, w(ϕ))-block trees, in the manner described. However, in order for this scheme to work, it is necessary that the height of the largest such (ϕ, w(ϕ))-block tree is less than the original block tree hosting the cluster. This may not be the case, especially if the cluster that becomes dense constitutes the whole block tree itself and too many of the intervals lies in the same sub-universe after the ϕ-stride is constructed.

As an example of when this particular problem occurs we can consider a (11,115)-block tree, in the example configuration, that becomes dense such that a 12-stride must be constructed and all remaining parts of the block tree eventually be converted to (10, 103)-block trees. Now, If all, or sufficiently many, intervals lies in the same sub-universe, we can not decompose the (11,115)-block tree by using the stride to obtain a set of structures of height 10. This means that if we put the (11,115)-block tree as it is directly under the constructed 12-stride, the height of the data structure as a whole is increased and the lookup cost budget is not possible to meet.

In order to handle this problem we first observe that the stride is larger than a memory block. In fact, its size is a multiple of the size of a memory block. In this particular case, the size of one memory block equals the size of 8 pointers in a stride and the smallest stride consist of 2ˆ7 pointers. This means that we can consider a stride as a list of compartments where each compartment corresponds to a memory block and contains up to 8 pointers. Furthermore, the cost for accessing all pointers in a compartment is the same as accessing a single one, namely one memory access. Therefore, we can use one bit in the beginning of the compartment to indicate whether it contains 8 pointers of an integrated root node, which we are now about to describe. Since the size of a compartment is exactly one memory block we can store one root nod there instead of a set of pointers. In essence, this will be equivalent to storing the block tree below the stride and having all pointers in the compartment referring to the root node, except that we save one memory access. This means that whenever the accumulated density of the sub-universes that corresponds to a compartment is too large to handle using the standard technique described in the previous section we can either integrate the existing root node in the compartment or build a new custom root node and integrate it depending on which is more convenient.

According to an embodiment of the present invention, the step of Stride Compartmentalization and Root Node Integration comprises organizing strides in compartment corresponding to memory blocks, encoding whether a compartment is contains standard pointers or an integrated root node, and possibly integrate the existing or newly constructed root node in the compartment to implement de-amortization, of the update reconstruction work that is required when a $\phi$-cluster changes between dense and sparse and the corresponding $k\phi$-stride is constructed/destructed, to reduce the worst case cost per operation and simultaneously perform sufficient reconstruction work to keep the data structure in shape to accommodate for further updates, when the standard technique for postponing reconstruction work does not work because of a high concentration of intervals in one sub-universe making it impossible to reduce the height of the block tree below the stride thus causing the worst case lookup cost to exceed the prescribed lookup cost budget.

Herein, the term "routing table" is referred to as a mapping from a set of IP-address prefixes, or simply address prefixes, to a set of next-hop indices. Routing tables are used to determine where to forward a datagram, typically an IP-datagram with a given destination address and retrieve the associated next-hop index representing what to do with the packet. The process of performing the longest match and retrieving the next-hop index is referred to as "routing lookup"

Throughout this application (including claims) we will use the terms "routing table", "partition of intervals", and "set of intervals" interchangeably to mean the input data from which the classification data structure is built.

By means of the invention, the data structure is possible to implement using a standard programming language such as C and run on a standard computer. To simplify the integration of such a data structure in a larger system it is also desirable to have guaranteed performance. In particular, the invention provides a data structure with guaranteed worst case lookup cost, update cost and storage cost.

The present invention has been described by given examples and embodiments not intended to limit the invention to those. A person skilled in the art recognizes that the attached set of claims sets forth other advantage embodiments.

LIST OF ABBREVIATIONS USED IN THIS SPECIFICATION

| | |
|---|---|
| BBT | Basic block tree |
| SBT | Static block tree |
| SP | Stockpiling |
| DBT | Dynamic block tree |
| FST | Fixed stride trie |
| SHT | Static hybrid tree |
| SHBT | Static hybrid block tree |
| DHBT | Dynamic hybrid block tree |
| DHT | Dynamic hybrid tree |

-continued

| | |
|---|---|
| ASC | Address space compression |
| 1dC | 1-dimensional classifier |
| DdC | D-dimensional classifier |
| IDdC | Improved D-dimensional classifier |

The invention claimed is:

1. A classifier device for representing a partition of n w-bit intervals associated to d-bit data in a data communications network, which device comprises:
   a storage for storing a datagram forwarding data structure provided for indicating where to forward a datagram in a network, which data structure is in the form of a tree comprising at least one leaf and possibly a number of nodes including partial nodes, said data structure having a height, corresponding to a number of memory accesses required for looking up a largest stored non-negative integer smaller than or equal to a query key,
   means for reducing worst storage cost by using a first technique for reduction of worst case storage cost that are selectable from: partial block tree compaction, virtual blocks, bit push pulling, block aggregation or split block trees, and
   means for updating the layered data structure partially including by using a second technique for scheduling maintenance work that are selectable from: vertical segmentation and bucket list maintenance,
   wherein the means for reducing worst storage cost and the means for updating the layered data structure partially are implemented in a classification chip comprising classifier lookup structure.

2. The classifier device according to claim 1, comprising means for performing the steps of:
   providing in a storage, a datagram forwarding data structure provided for indicating where to forward a datagram in said network, which data structure is in the form of a block tree, or fixed stride trie, comprising at least one leaf and possibly a number of nodes including partial nodes, said data structure having a height, corresponding to a number of memory accesses required for lookup in an arbitrary partition comprising n intervals,
   reducing worst storage cost by using the first technique for reduction of worst case storage cost that are selectable from: partial block tree compaction, virtual blocks, bit push pulling, block aggregation or split block trees, and variations thereof,
   updating the layered data structure partially by using the second technique for scheduling maintenance work that are selectable from: vertical segmentation and bucket list maintenance, and providing a hybrid structure of a static data structure, where a storage cost is linear with a number of intervals,
   wherein the technique for reduction of worst case storage cost comprises partial block tree compaction, the latter including the sub-steps of:
   storing multiple partial nodes in the same memory block,
   storing partial nodes across two memory blocks,
   moving partial nodes to under utilized memory blocks higher up in the tree.

3. The classifier device according to claim 1 comprising a main memory connected to the classification chip comprising classifier support structure and program.

4. A system comprising two or more classifier devices according to claim 1.

* * * * *

UNITED STATES PATENT AND TRADEMARK OFFICE
CERTIFICATE OF CORRECTION

PATENT NO.        : 8,401,015 B2
APPLICATION NO.   : 12/446305
DATED             : March 19, 2013
INVENTOR(S)       : Mikael Sundström It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 470 days.

Signed and Sealed this
First Day of September, 2015

Michelle K. Lee
*Director of the United States Patent and Trademark Office*